No. 688,469. Patented Dec. 10, 1901.
R. KNIETSCH.
APPARATUS FOR THE MANUFACTURE OF SULFURIC ANHYDRID.
(Application filed Aug. 18, 1899.)
(No Model.)

WITNESSES:

INVENTOR
Rudolf Knietsch
BY
ATTORNEYS.

UNITED STATES PATENT OFFICE.

RUDOLF KNIETSCH, OF LUDWIGSHAFEN, GERMANY, ASSIGNOR TO THE BADISCHE ANILIN- & SODA-FABRIK, OF LUDWIGSHAFEN, GERMANY, A CORPORATION OF GERMANY.

APPARATUS FOR THE MANUFACTURE OF SULFURIC ANHYDRID.

SPECIFICATION forming part of Letters Patent No. 688,469, dated December 10, 1901.

Original application filed July 14, 1898, Serial No. 685,969. Divided and this application filed August 18, 1899. Serial No. 727,636. (No model.)

*To all whom it may concern:*

Be it known that I, RUDOLF KNIETSCH, doctor of philosophy, a subject of the King of Prussia, Emperor of Germany, residing at Ludwigshafen-on-the-Rhine, in the Kingdom of Bavaria and Empire of Germany, have invented new and useful Improvements in Apparatus for the Manufacture of Sulfuric Anhydrid, of which the following is a specification.

In my application, Serial No. 685,969, filed July 14, 1898, I have described the apparatus which is the subject of this application and included it within generic claims, and I file this as a division of said application for the purpose of securing specific claims on said apparatus.

Figure 1:
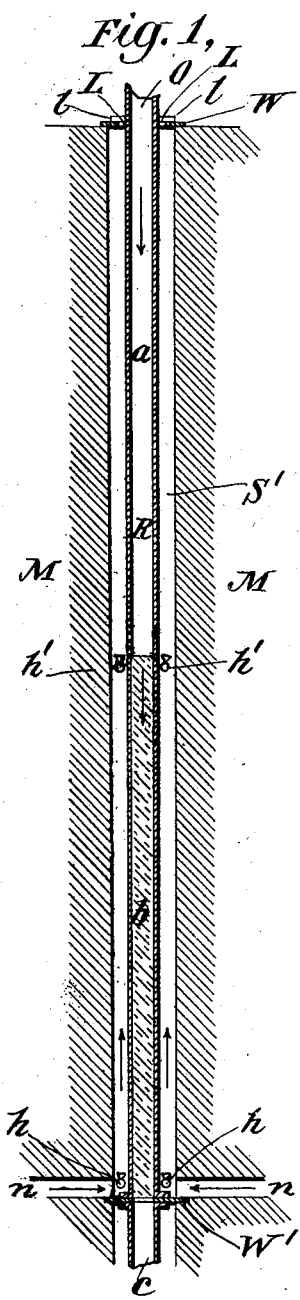
Figure 2:
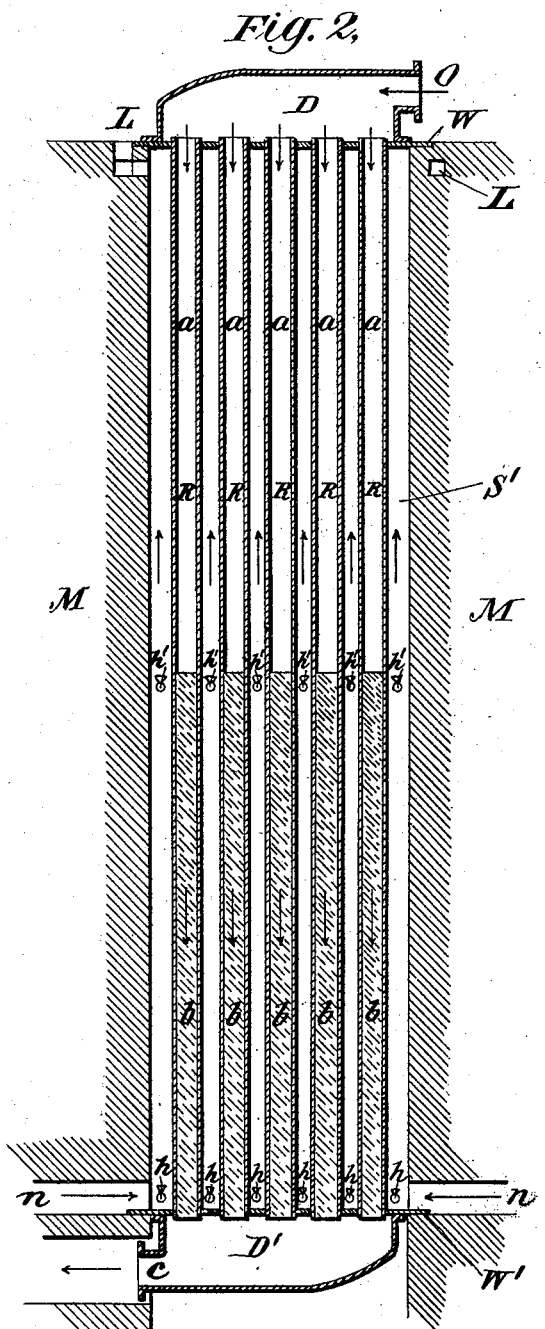

In the accompanying drawings, Figure 1 is a vertical section of an apparatus containing a single contact-chamber represented by a tube or pipe R. Fig. 2 is a vertical section of an apparatus containing a plurality of contact-chambers represented by tubes or pipes R.

Referring, first, to Fig. 1, M represents a brickwork structure or an iron pipe. Within this a pipe R is fixed, leaving the passage S' between. This pipe R consists of two parts $a$ and $b$, which have different functions and may differ from one another in length and diameter. Also, either part can be replaced by a plurality of narrower pipes. The portion $b$ of the pipe R is occupied by the contact substance, (indicated in the drawings by broken section-lines,) and this is cooled by the cold air entering the passage S' at $n$. In the other part, $a$, of the pipe R the gases containing the sulfur dioxid, which enter at O, are heated to the temperature necessary for the reaction. When commencing the operation, the whole apparatus is first raised to the temperature necessary for the reaction by heating by means of $h\ h$—say gas-flames. Then when gases rich in sulfur dioxid are used after the reaction has once commenced further heating is unnecessary, because the air as it passes through the pipe M in contact with that part $b$ of the pipe R in which the reaction is in progress in extracting the excess of heat due to the reaction absorbs the heat and transfers sufficient heat to the other portion $a$ to prevent a change of position of the reaction zone or the entire cessation of the reaction. The current of air can be regulated by means of the updraft-openings L L, which are adjustable by the slides $l\ l$. It is regulated in such a way that the contact substance in $b$ is constantly maintained at the most favorable temperature for the reaction. When the gases contain but little sulfur dioxid, the air, which is somewhat heated by its cooling action on the contact substance, is further heated by suitable means $h'\ h'$, such as gas-flames, so that the gases in flowing through part $a$ receive a greater increment of heat. When the gases are still poorer in sulfur dioxid, it may be necessary to continually heat to some extent the current of air flowing in through $n$, either by means of the gas-flames at $h\ h$ or in some other way. The gases containing the sulfuric anhydrid issuing from the contact-chamber $b$ leave the apparatus by the pipe C and are worked up in any suitable way.

The apparatus represented in Fig. 2 is made up of a plurality of contact-tubes R R, which are in connection with one another by means of the two tube-plates W W' and the covers D D' above and below. In other respects it resembles Fig. 1.

I claim—

1. In an apparatus for manufacturing sulfuric anhydrid by the contact process, in combination an inclosure R containing ingress and egress openings through which ingress gas containing sulfur dioxid and oxygen passes, the contact material occupying a portion of said inclosure near the egress therefrom and a cooling-fluid conduit containing inlet and outlet openings independent of said ingress and egress openings, whereby a cooling fluid is led adjacent to said inclosure from the egress end toward the ingress end thereof, whereby the excess of heat due to the reaction is transferred by said cooling fluid from the contact material to the gases on their way to the contact material.

2. In an apparatus for manufacturing sulfuric anhydrid, by the contact process, in combination an inclosure R containing ingress and egress openings through which ingress gas containing sulfur dioxid and oxygen passes, the contact material occupying a portion of said inclosure near the egress therefrom, a cooling-fluid conduit whereby a current of cooling fluid is led adjacent to said inclosure from the egress end thereof toward the ingress end thereof and a means of heating, $h$, whereby that portion of said inclosure containing said contact material may be heated.

3. In an apparatus for manufacturing sulfuric anhydrid by the contact process, in combination an inclosure R containing ingress and egress openings through which ingress gas containing sulfur dioxid and oxygen passes, the contact material occupying a portion of said inclosure near the egress therefrom, a cooling-fluid conduit whereby a current of cooling fluid is led adjacent to said inclosure from the egress end thereof toward the ingress end thereof, and a means of heating, $h'$, whereby that portion of said inclosure not containing said contact material may be heated.

In testimony whereof I have hereunto set my hand in the presence of two subscribing witnesses.

RUDOLF KNIETSCH.

Witnesses:
ERNEST F. EHRHARDT,
BERNHARD C. HESSE.